R. STOCK.
VEHICLE WHEEL.
APPLICATION FILED FEB. 12, 1920.

1,400,919. Patented Dec. 20, 1921.

Inventor:
Robert Stock
by attorneys

UNITED STATES PATENT OFFICE.

ROBERT STOCK, OF SANDUSKY, OHIO.

VEHICLE-WHEEL.

1,400,919.　　　Specification of Letters Patent.　　Patented Dec. 20, 1921.

Application filed February 12, 1920. Serial No. 358,220.

*To all whom it may concern:*

Be it known that I, ROBERT STOCK, a citizen of the United States, and resident of the city of Sandusky, in the county of Erie and State of Ohio, have invented a new and useful Improvement in Vehicle-Wheels, of which the following is a specification.

This invention relates to an improvement in vehicle wheels with the object in view of providing a wheel structure which will be strong, durable and simple in construction.

Another object is to provide a wheel structure in which the spokes are supported at a plurality of points throughout their lengths.

Another object is to provide a wheel structure having a plurality of supports interposed between the hub and rim, certain of said supports being located edgewise and others flatwise with respect to the spokes.

A still further object is to provide certain improvements in the form, construction and arrangement of the several elements, whereby the above named and other objects may be effectively attained.

Figure 1:
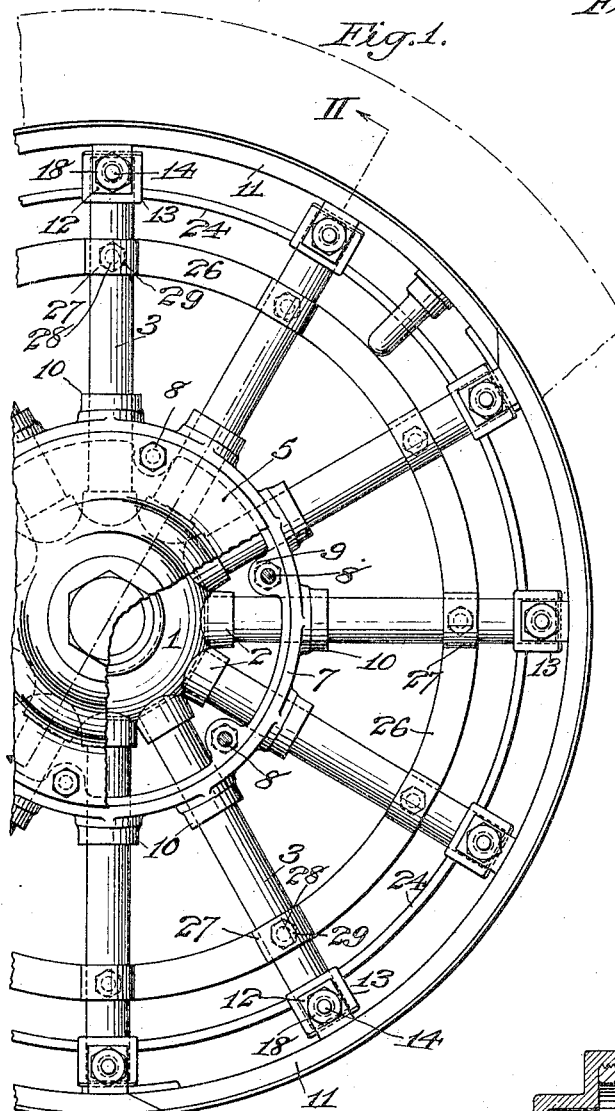

A practical embodiment of my invention is represented in the accompanying drawing, in which, Figure 1 represents a side elevation of a portion of a wheel, showing my improved wheel structure, certain of the parts being broken away to show the structure within.

Figure 2:
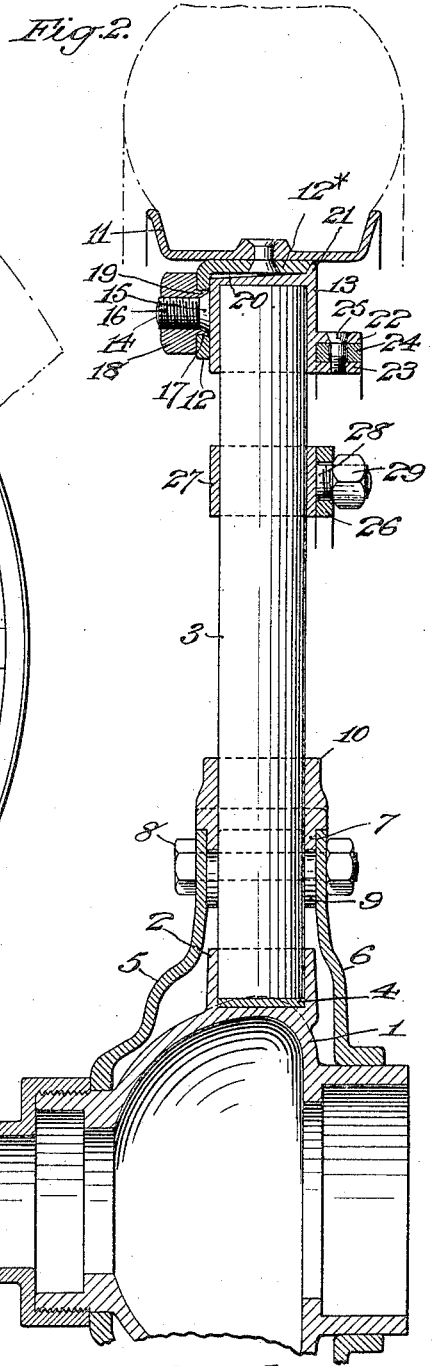
Figure 3:
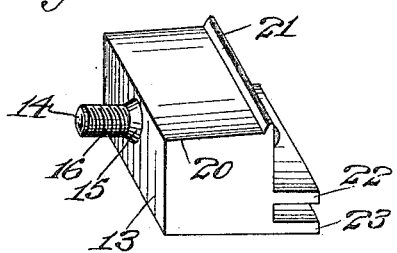

Fig. 2 represents a vertical section on an enlarged scale, taken in the plane of the line II of Fig. 1, looking in the direction of the arrows, and Fig. 3 represents a perspective view of one of the devices for attaching the rim to the spoke.

The hub of the wheel denoted by 1 is provided with a series of radially arranged sockets 2, located in position to receive spokes 3, which are seated on disks 4 in the bottom of the sockets 2.

Hub plates 5, 6 are located on the hub upon opposite sides of the sockets 2 and spokes 3 and secured to a spacer ring 7 by means of bolts 8, which pass through lugs 9, inwardly disposed between the spokes. This ring 7 is also provided with a series of collars 10, arranged in position to embrace and support the spokes at the outer periphery of the hub plates.

A rim 11 is provided with inwardly disposed lugs 12, which lugs, in the present instance, formed by angle pieces riveted to the rim as shown at 12*, are arranged to be seated on blocks 13, fitted on the outer end of the spokes 3. The lugs 12 are removably secured to the blocks by means of a lock bolt and nut connection, of which the bolt 14, carried by the block, is provided with a tapered portion 15 interposed between the threaded portion 16 of the bolt and the block. The lugs 12 are each provided with an undercut hole 17, the walls of which, in the present instance, are tapered approximately parallel with the tapered portion 15 of the bolt, but spaced therefrom. A nut 18, having protruding annular lips 19 is screw-threaded to engage the threaded portion 16 of the bolt, so that when the nut is screwed on the bolt, the annular lip 19 will enter the space between the hole 17 and tapered portion 15, and be forced outwardly by the tapered portion 15 so as to engage the inclined walls of the hole 17 in the lugs and thereby securely lock the lugs and blocks together. The outer face of each block is beveled, as shown at 20, and provided with an outwardly projecting stop 21 so that its angle piece 12* may slide easily thereon and be held against the stop 21.

The blocks are also provided with laterally projecting inner and outer flanges 22, 23, between which a band 24 is located edgewise with respect to the spokes and retained therein by means of screws 25 passing through the outer flange 22 and band 24, and threaded into the inner flange 23.

As an additional means of support for the spokes, I interposed between the band 24 and the collars 10 of the spacer ring 7, a ring 26, which is located flatwise with respect to the spokes and secured to sleeves 27, fitted on the spokes, which sleeves are provided with screw-threaded studs 28 arranged to pass through holes in the ring and receive nuts 29, which hold the ring securely to the sleeves. By means of the band 24 and ring 26 and the position in which they are located with respect to each other and to the spokes a decidedly rigid structure is obtained.

Thus it will be seen that the spokes are supported at four different points throughout their length, viz:—at one end by the sockets 2 on the hub 1, the other end by the band 24 and its blocks 13, and intermediate these ends by a ring 26 with its sleeves 27 adjacent the blocks and band, and a spacer ring 7 with its collars 10 and hub plates 5, 6. It is therefore evident that by reason of these several supports for the spokes, a very strong and durable wheel is produced and one that is fully capable of resisting any amount of side stress and strain, without having to add materially to its bulk or weight.

While I have shown and described a single band 24 and a ring 26, I wish it understood that a plurality of bands and rings may be applied to the wheel, if desired, to afford a still more rigid structure.

It is obvious that various changes may be resorted to in the form, construction and arrangement of the several elements, without departing from the spirit and scope of my invention; hence I do not intend to be limited to the structure herein shown and described, except as set forth in the appended claims.

What I claim is:

1. The combination with a vehicle wheel having a hub, spokes therefor, and a tire rim, of a band interposed between said hub and rim and located edgewise with respect to the spokes for supporting the spokes intermediate the hub and rim.

2. The combination with a vehicle wheel having a hub, spokes therefor, and a tire rim, of a band interposed between said hub and rim at one side of said spokes and located edgewise with respect to the spokes for supporting the spokes intermediate the hub and rim.

3. The combination with a vehicle wheel having a hub, spokes therefor, and a tire rim, of a band, and a ring interposed between said hub and rim, said band being located edgewise and said ring flatwise with respect to the spokes for supporting the spokes intermediate the hub and rim.

4. The combination with a vehicle wheel having a hub, spokes therefor, and a tire rim, of a band interposed between said hub and rim and located edgewise with respect to said spokes, and a spacer ring supported from the hub engaging the spokes for supporting them intermediate the hub and rim.

5. The combination with a vehicle wheel having a hub, spokes therefor, and a tire rim, of a band, a ring interposed between said hub and rim, and a spacer ring supported from the hub engaging said spokes, said band, ring and spacer ring supporting the spokes intermediate the hub and rim.

6. The combination with a vehicle wheel having a hub, spokes therefor, and a tire rim, of a band, a ring interposed between said hub and rim, said band being located edgewise and said ring flatwise with respect to said spokes, and a spacer ring supported from the hub engaging the spokes, said band, ring and spacer ring supporting the spokes intermediate the hub and rim.

In testimony that I claim the foregoing as my invention I have signed my name this seventh day of February, 1920.

ROBERT STOCK.